United States Patent
Xie

(10) Patent No.: US 10,239,761 B2
(45) Date of Patent: Mar. 26, 2019

(54) SYNTHESIS OF ZEOLITE SSZ-31

(71) Applicant: Chevron U.S.A. Inc., San Ramon, CA (US)

(72) Inventor: Dan Xie, Richmond, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 15/846,441

(22) Filed: Dec. 19, 2017

(65) Prior Publication Data

US 2018/0194638 A1    Jul. 12, 2018

Related U.S. Application Data

(60) Provisional application No. 62/444,909, filed on Jan. 11, 2017.

(51) Int. Cl.
*C01B 39/48* (2006.01)
*C01B 37/02* (2006.01)
*B01J 29/70* (2006.01)

(52) U.S. Cl.
CPC ........... *C01B 39/48* (2013.01); *B01J 29/70* (2013.01); *C01B 37/02* (2013.01)

(58) Field of Classification Search
CPC .......... C01B 37/02; C01B 39/48; B01J 29/70
See application file for complete search history.

(56) References Cited

U.S. PATENT DOCUMENTS

| 5,106,801 A | 4/1992 | Zones et al. |
| 5,215,648 A | 6/1993 | Zones et al. |
| 6,471,940 B1 | 10/2002 | Kurata et al. |
| 2003/0190282 A1* | 10/2003 | Schmitt et al. ......... C01B 37/00 423/705 |

FOREIGN PATENT DOCUMENTS

| EP | 1088790 A1 | 4/2001 |
| WO | WO-9629284 A1 * | 9/1996 ............. C01B 39/04 |

OTHER PUBLICATIONS

R.F. Lobo, M. Tsapatsis, C.C. Freyhardt, I. Chan, C-Y. Chen, S.I. Zones, and M. Davis "A Model for the Structure of the Large-Pore Zeolite SSZ-31" J. Am. Chem. Soc. 1997, 119, 3732-3744.
R.K. Ahedi, Y. Kubota and Y. Sugi "Hydrothermal synthesis of [Al]SSZ-31 from [Al]-BEA precursors" J. Mater. Chem. 2001, 11, 2922-2924.
H. Van Koningsveld and R.F. Lobo "Disorder in Zeolite SSZ-31 Described on the Basis of One-Dimensional Building Units" J. Phys. Chem. B 2003, 107, 10983-10989.
PCT International Search Report, International Patent Appl. No. PCT/US2017/067267, dated Mar. 13, 2018.
R. Bandyopadhyay, Y. Kubota, M. Ogawa, N. Sugimoto, Y. Fukushima and Y. Sugi "Synthesis of [Al]-SSZ-31 by Dry-Gel Conversion (DGC) Method" Chem. Lett. 2000, 29, 300-301.

* cited by examiner

*Primary Examiner* — David M Brunsman
(74) *Attorney, Agent, or Firm* — Terrence M. Flaherty

(57) ABSTRACT

A method is provided for synthesizing zeolite SSZ-31 using 2-ethyl-N,N,N-trimethylbutan-1-aminium cations as a structure directing agent.

7 Claims, 3 Drawing Sheets

SYNTHESIS OF ZEOLITE SSZ-31

CROSS-REFERENCE TO RELATED APPLICATIONS

This application claims priority to U.S. Provisional Application Ser. No. 62/444,909, filed on Jan. 11, 2017, the disclosure of which is fully incorporated herein by reference.

TECHNICAL FIELD

This disclosure relates to a method of synthesizing zeolite SSZ-31.

BACKGROUND

Molecular sieve materials, both natural and synthetic, have been demonstrated in the past to be useful as adsorbents and to have catalytic properties for various types of hydrocarbon conversion reactions. Certain molecular sieves, such as zeolites, aluminosphosphates, and mesoporous materials, are ordered, porous crystalline materials having a definite crystalline structure as determined by X-ray diffraction (XRD). Within the crystalline molecular sieve material there are a large number of cavities which may be interconnected by a number of channels or pores. These cavities and pores are uniform in size within a specific molecular sieve material. Because the dimensions of these pores are such as to accept for adsorption molecules of certain dimensions while rejecting those of larger dimensions, these materials have come to be known as "molecular sieves" and are utilized in a variety of industrial processes.

High-silica zeolite SSZ-31 is a highly faulted molecular sieve material having one-dimensional 12-membered ring pores with pore dimensions of approximately 8.6 Å×5.7 Å. The framework structure of SSZ-31 has been assigned the three-letter code *STO by the Structure Commission of the International Zeolite Association.

The composition and characterizing powder X-ray diffraction pattern of SSZ-31 are disclosed in U.S. Pat. No. 5,106,801, which also describes the synthesis of the borosilicate form of the zeolite in the presence of a structure directing agent selected from N,N,N-trimethylammonium-8-tricyclo[5.2.1.0]decane, 4-trimethylammonium-2,2,6,6-tetramethylpiperidine, N,N-dimethyl-3-azonium bicyclo [3.2.2]nonane, N,N,N-trimethylammonium-2-bicyclo[3.2.1] octane, N,N-dimethyl-6-azonium-1,3,3-trimethylbicyclo [3.2.1]octane, and N,N,3,5,5-pentamethyl azonium cycloheptane. An all-silica form of SSZ-31 was synthesized using N,N,N-trimethylammonium-8-tricyclo[5.2.1.0]decane as a structure directing agent.

Due to the very large pore diameter of SSZ-31, forms of SSZ-31 with aluminum incorporated into the zeolite framework structure are of interest for shape-selective catalysis, such as the alkylation of relatively bulky aromatic compounds.

Aluminosilicate SSZ-31 (Al-SSZ-31) may be prepared indirectly from borosilicate SSZ-31 (B-SSZ-31) by heteroatom lattice substitution techniques such as described in U.S. Pat. No. 5,106,801.

U.S. Pat. No. 6,471,940 discloses the direct synthesis of Al-SSZ-31 by a dry-gel conversion method using a structure directing agent selected from hexamethylene bis(triethylammonium hydroxide), heptamethylene bis(triethylammonium hydroxide), octamethylene bis(triethylammonium hydroxide), nonamethylene bis(triethylammonium hydroxide), and decamethylene bis(triethylammonium hydroxide).

R. K. Ahedi et al. (*J. Mater. Chem.* 2001, 11, 2922-2924) report the direct synthesis of Al-SSZ-31 from Al-BEA precursors by a hydrothermal route using hexamethylene bis(triethylammonium hydroxide) as a structure directing agent.

According to the present disclosure, it has now been found that 2-ethyl-N,N,N-trimethylbutan-1-aminium cations are effective as a structure directing agent in the direct synthesis of all-silica and aluminosilicate forms of zeolite SSZ-31.

SUMMARY

In one aspect, there is provided a method of synthesizing a zeolite having the structure of SSZ-31, the method comprising: (a) preparing a reaction mixture comprising: (1) a source of silicon oxide; (2) optionally, a source of aluminum oxide; (3) a structure directing agent comprising 2-ethyl-N,N,N-trimethylbutan-1-aminium cations; (4) hydroxide ions; and (5) water; and (b) subjecting the reaction mixture to crystallization conditions sufficient to form crystals of the zeolite.

In another aspect, there is provided a zeolite having the structure of SSZ-31 and comprising 2-ethyl-N,N,N-trimethylbutan-1-aminium cations in its pores.

In its as-synthesized and anhydrous form, the zeolite has a chemical composition comprising the following molar relationship:

|  | Broad | Exemplary |
| --- | --- | --- |
| $SiO_2/Al_2O_3$ | ≥50 | 200 to 500 |
| $Q/SiO_2$ | >0 to 0.1 | >0 to 0.1 | wherein Q comprises 2-ethyl-N,N,N-trimethylbutan-1-aminium cations.

DETAILED DESCRIPTION

Introduction

Figure 1:
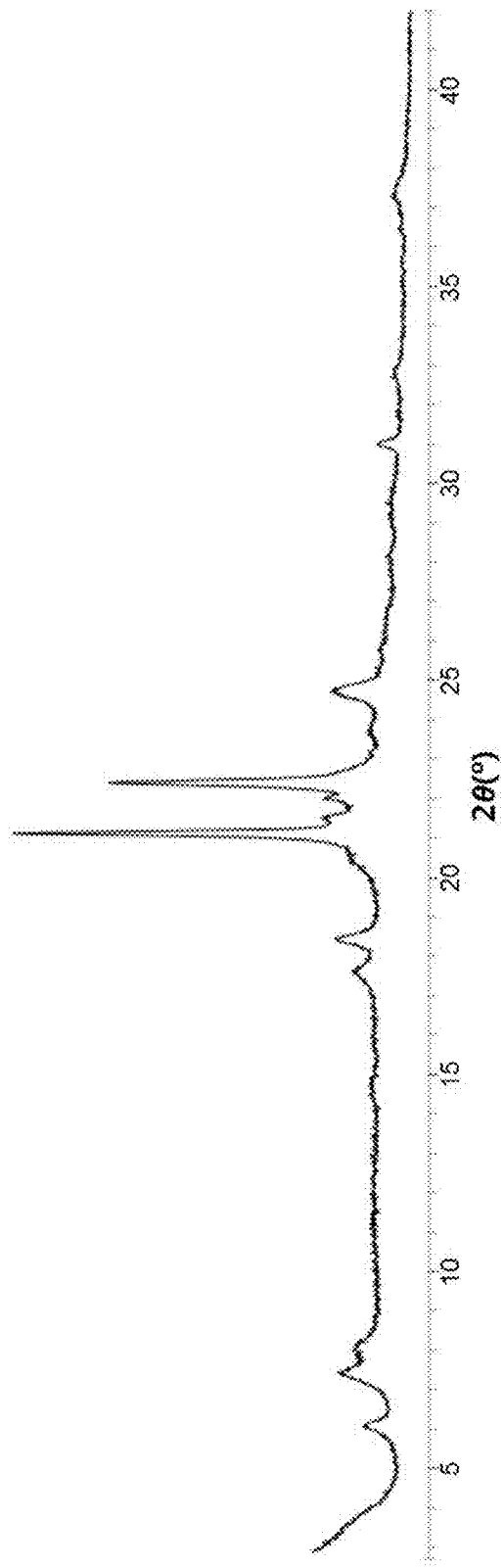
FIG. 1 is a powder X-ray diffraction (XRD) pattern of the as-synthesized zeolite product of Example 1.

The term "as-synthesized" is employed herein to refer to a zeolite in its form after crystallization, prior to removal of the structure directing agent.

The term "anhydrous" is employed herein to refer to a zeolite substantially devoid of both physically adsorbed and chemically adsorbed water.

As used herein, the numbering scheme for the Periodic Table Groups is as disclosed in *Chem. Eng. News* 1985, 63(5), 26-27.

Reaction Mixture

All-silica and aluminosilicate forms of zeolite SSZ-31 can be directly synthesized from an aqueous reaction mixture comprising 2-ethyl-N,N,N-trimethylbutan-1-aminium cations, as described herein below. The term "directly synthesized" in the context of the present disclosure means that the zeolite is formed from the reaction mixture described below, as opposed to forming a zeolite containing silicon oxide and another oxide (e.g., boron oxide) and then subjecting the thus-formed zeolite to a post-synthesis treatment to create an all-silica or aluminosilicate SSZ-31 zeolite.

In general, a zeolite having the framework structure of SSZ-31 can be synthesized by: (a) preparing a reaction mixture comprising (1) a source of silicon oxide; (2) optionally, a source of aluminum oxide; (3) a structure directing agent (Q) comprising 2-ethyl-N,N,N-trimethylbutan-1-aminium cations; (4) hydroxide ions; and (5) water; and (b) subjecting the reaction mixture to crystallization conditions sufficient to form crystals of the zeolite.

The composition of the reaction mixture from which the zeolite is formed, in terms of molar ratios, is identified in Table 1 below:

TABLE 1

| Reactants | Useful | Exemplary |
| --- | --- | --- |
| $SiO_2/Al_2O_3$ | ≥50 | 100 to 1000 |
| $Q/SiO_2$ | 0.05 to 0.50 | 0.10 to 0.45 |
| $OH/SiO_2$ | 0.05 to 0.50 | 0.20 to 0.45 |
| $H_2O/SiO_2$ | 10 to 60 | 15 to 50 | wherein Q is as described herein above.

Suitable sources of silicon oxide include fumed silica, colloidal silica, precipitated silica, alkali metal silicates, and tetraalkyl orthosilicates.

Suitable sources of aluminum oxide include hydrated alumina and water-soluble aluminum salts (e.g., aluminum nitrate).

Combined sources of silicon oxide and aluminum oxide can additionally or alternatively be used and can include aluminosilicate zeolites (e.g., zeolite Y) and clays or treated clays (e.g., metakaolin).

The structure directing agent (Q) comprises 2-ethyl-N,N,N-trimethylbutan-1-aminium cations, represented by the following structure (1):

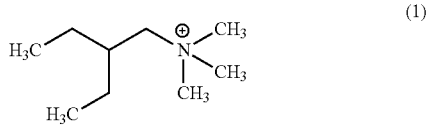

(1)

Suitable sources of Q include the hydroxides, chlorides, bromides, and/or other salts of the quaternary ammonium compound.

The reaction mixture may also contain seeds of a molecular sieve material, such as SSZ-31, from a previous synthesis, desirably in an amount of from 0.01 to 10,000 ppm by weight (e.g., from 100 to 5000 ppm by weight) of the reaction mixture.

For each embodiment described herein, the reaction mixture can be supplied by more than one source. Also, two or more reaction components can be provided by one source.

The reaction mixture can be prepared either batch wise or continuously. Crystal size, morphology and crystallization time of the crystalline zeolite described herein can vary with the nature of the reaction mixture and the crystallization conditions.

Crystallization and Post-Synthesis Treatment

Crystallization of the zeolite from the above reaction mixture can be carried out under either static, tumbled or stirred conditions in a suitable reactor vessel, such as for example polypropylene jars or Teflon-lined or stainless steel autoclaves, at a temperature of from 125° C. to 200° C. for a time sufficient for crystallization to occur at the temperature used, e.g., from 5 to 20 days. Crystallization is usually carried out in closed system under autogenous pressure.

Once the zeolite crystals have formed, the solid product is recovered from the reaction mixture by standard mechanical separation techniques such as centrifugation or filtration. The crystals are water-washed and then dried to obtain the as-synthesized zeolite crystals. The drying step is typically performed at a temperature of less than 200° C.

As a result of the crystallization process, the recovered crystalline zeolite product contains within its pore structure at least a portion of the structure directing agent used in the synthesis.

The as-synthesized zeolite may be subjected to treatment to remove part or all of the structure directing agent used in its synthesis. This is conveniently effected by thermal treatment (calcination) in which the as-synthesized material is heated at a temperature of at least about 370° C. for at least 1 minute and generally not longer than 20 hours. The thermal treatment can be performed at a temperature up to about 925° C. While sub-atmospheric pressure can be employed for the thermal treatment, atmospheric pressure is desired for reasons of convenience. Additionally or alternatively, the structure directing agent can be removed by treatment with ozone (see, e.g., A. N. Parikh et al., *Micropor. Mesopor. Mater.* 2004, 76, 17-22).

To the extent desired and depending on the $SiO_2/Al_2O_3$ molar ratio of the material, any inorganic cations in the as-synthesized zeolite can be replaced in accordance with techniques well known in the art by ion exchange with other cations. Suitable replacing cations include metal ions, hydrogen ions, hydrogen precursor ions (e.g., ammonium ions), and mixtures thereof. Particularly preferred replacing cations are those which tailor the catalytic activity for certain organic conversion reactions. These include hydrogen, rare earth metals and metals of Groups 2 to 15 of the Periodic Table of the Elements.

Characterization of the Zeolite

In its as-synthesized and anhydrous form, the present zeolite has a chemical composition comprising the following molar relationship:

| | Broad | Exemplary |
| --- | --- | --- |
| $SiO_2/Al_2O_3$ | ≥50 | 200 to 500 |
| $Q/SiO_2$ | >0 to 0.1 | >0 to 0.1 | wherein Q comprises 2-ethyl-N,N,N-trimethylbutan-1-aminium cations. It will be appreciated from the permitted values for the $SiO_2/Al_2O_3$ molar ratio that the present zeolite can be synthesized in a totally siliceous form (i.e., an "all-silica" form) in which aluminum oxide is absent or essentially absent.

As taught by U.S. Pat. No. 5,106,801, zeolite SSZ-31 has, in its as-synthesized form, an X-ray diffraction pattern which includes at least the peaks set forth in Table 2 below.

TABLE 2

Characteristic Peaks for As-Synthesized SSZ-31

| 2-Theta | d-spacing (nm) | Relative Intensity[a] |
| --- | --- | --- |
| 6.10 | 1.449 | W |
| 7.38 | 1.198 | M |
| 8.18 | 1.081 | W |

TABLE 2-continued

Characteristic Peaks for As-Synthesized SSZ-31

| 2-Theta | d-spacing (nm) | Relative Intensity[a] |
|---|---|---|
| 20.30 | 0.437 | W |
| 21.12 | 0.421 | VS |
| 22.25 | 0.399 | VS |
| 24.73 | 0.360 | M |
| 30.90 | 0.289 | W |

[a]The powder XRD patterns provided are based on a relative intensity scale in which the strongest line in the XRD pattern is assigned a value of 100: W = weak (>0 to ≤20); M = medium (>20 to ≤40); S = strong (>40 to ≤60); VS = very strong (>60 to ≤100).

The powder X-ray diffraction patterns presented herein were collected by standard techniques. The radiation was CuKα radiation. The peak heights and the positions, as a function of 2θ where θ is the Bragg angle, were read from the relative intensities of the peaks, and d, the interplanar spacing corresponding to the recorded lines, can be calculated.

Minor variations in the diffraction pattern can result from variations in the mole ratios of the framework species of the particular sample due to changes in lattice constants. In addition, sufficiently disordered materials and/or small crystals will affect the shape and intensity of peaks, leading to significant peak broadening. Minor variations in the diffraction pattern can result from variations in the organic compound used in the preparation. Calcination can also cause minor shifts in the X-ray diffraction pattern.

EXAMPLES

The following illustrative examples are intended to be non-limiting.

Example 1

Synthesis of all-Silica SSZ-31

2.51 g of deionized water, 5.68 g of a 14.88% 2-ethyl-N,N,N-trimethylbutan-1-aminium hydroxide solution and 3.00 g of LUDOX® AS-30 colloidal silica were mixed together in a Teflon liner. The resulting gel was stirred until it became homogeneous. The liner was then capped and placed with a Parr steel autoclave reactor. The autoclave was then placed in an oven and heated at 170° C. for 8 days with tumbling at 43 rpm. The solid products were recovered from the cooled reactor by centrifugation, washed with deionized water and dried at 95° C.

The powder XRD pattern of the product is shown in FIG. 1 and is consistent with the product being SSZ-31.

Figure 2:
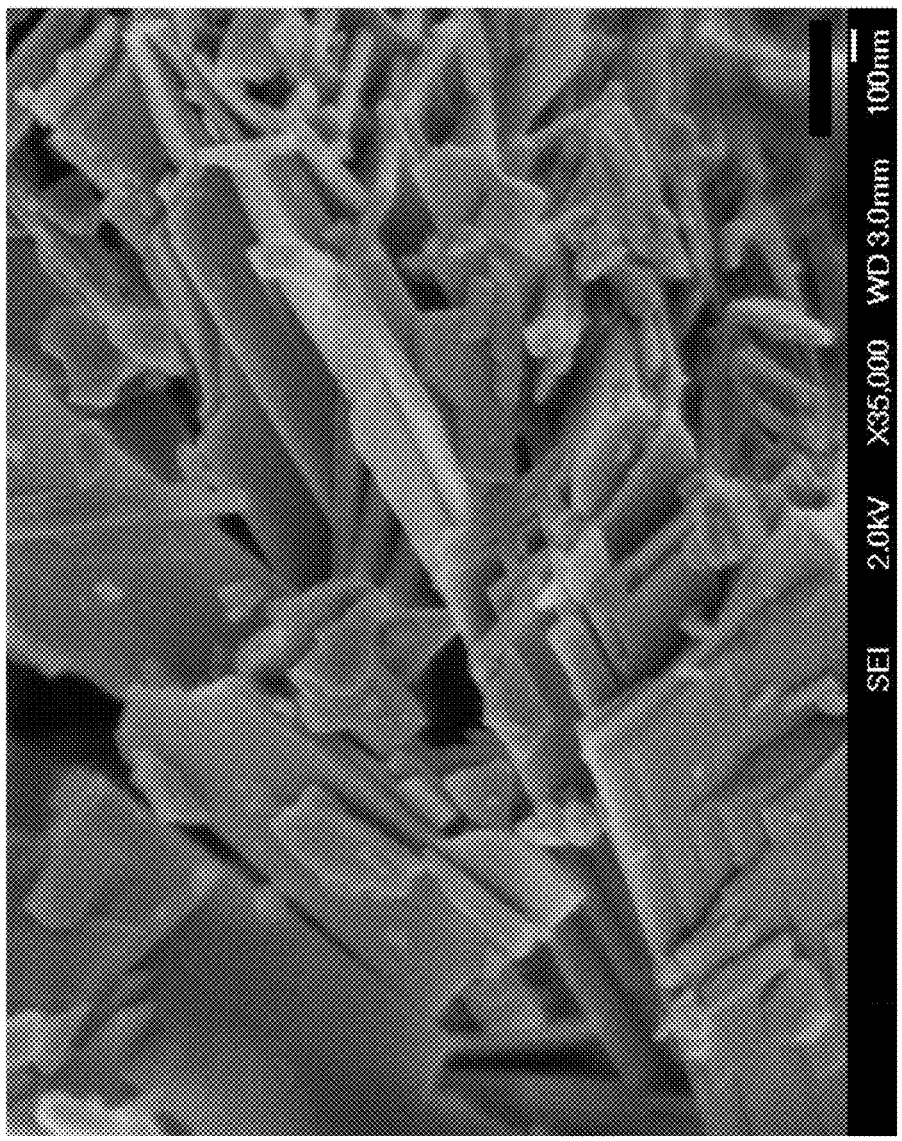
FIG. 2 is a Scanning Electron Micrograph (SEM) image of the as-synthesized zeolite product of Example 1.

FIG. 2 shows a SEM image of the as-synthesized product and indicates a uniform field of crystals.

Example 2

Synthesis of All-Silica SSZ-31

21.38 g of deionized water, 15.15 g of a 14.88% 2-ethyl-N,N,N-trimethylbutan-1-aminium hydroxide solution and 14.00 g of LUDOX® AS-30 colloidal silica were mixed together in a Teflon liner. The resulting gel was stirred until it became homogeneous. The liner was then capped and placed with a Parr steel autoclave reactor. The autoclave was then placed in an oven and heated at 170° C. for 9 days with tumbling at 43 rpm. The solid products were recovered from the cooled reactor by centrifugation, washed with deionized water and dried at 95° C.

The resulting zeolite product was identified by powder XRD and SEM as a pure silicate SSZ-31 zeolite.

Example 3

Synthesis of Aluminosilicate SSZ-31

3.20 g of deionized water, 4.87 g of a 14.88% 2-ethyl-N,N,N-trimethylbutan-1-aminium hydroxide solution, 3.00 g of LUDOX® AS-30 colloidal silica and 8 mg of Reheis F-2000 hydrated alumina were mixed together in a Teflon liner. The resulting gel was stirred until it became homogeneous. The liner was then capped and placed with a Parr steel autoclave reactor. The autoclave was then placed in an oven and heated at 170° C. for 10 days with tumbling at 43 rpm. The solid products were recovered from the cooled reactor by centrifugation, washed with deionized water and dried at 95° C.

The resulting zeolite product was identified by powder XRD and SEM as a pure aluminosilicate SSZ-31 zeolite.

The product had a $SiO_2/Al_2O_3$ molar ratio of 367, as determined by ICP elemental analysis.

Example 4

Synthesis of Aluminosilicate SSZ-31

2.50 g of deionized water, 5.68 g of a 14.88% 2-ethyl-N,N,N-trimethylbutan-1-aminium hydroxide solution, 3.00 g of LUDOX® AS-30 colloidal silica and 15 mg of Reheis F-2000 hydrated alumina were mixed together in a Teflon liner. The resulting gel was stirred until it became homogeneous. The liner was then capped and placed with a Parr steel autoclave reactor. The autoclave was then placed in an oven and heated at 170° C. for 12 days with tumbling at 43 rpm. The solid products were recovered from the cooled reactor by centrifugation, washed with deionized water and dried at 95° C.

The resulting zeolite product was identified by powder XRD and SEM as a pure aluminosilicate SSZ-31 zeolite.

Example 5

Calcination of SSZ-31

Figure 3:
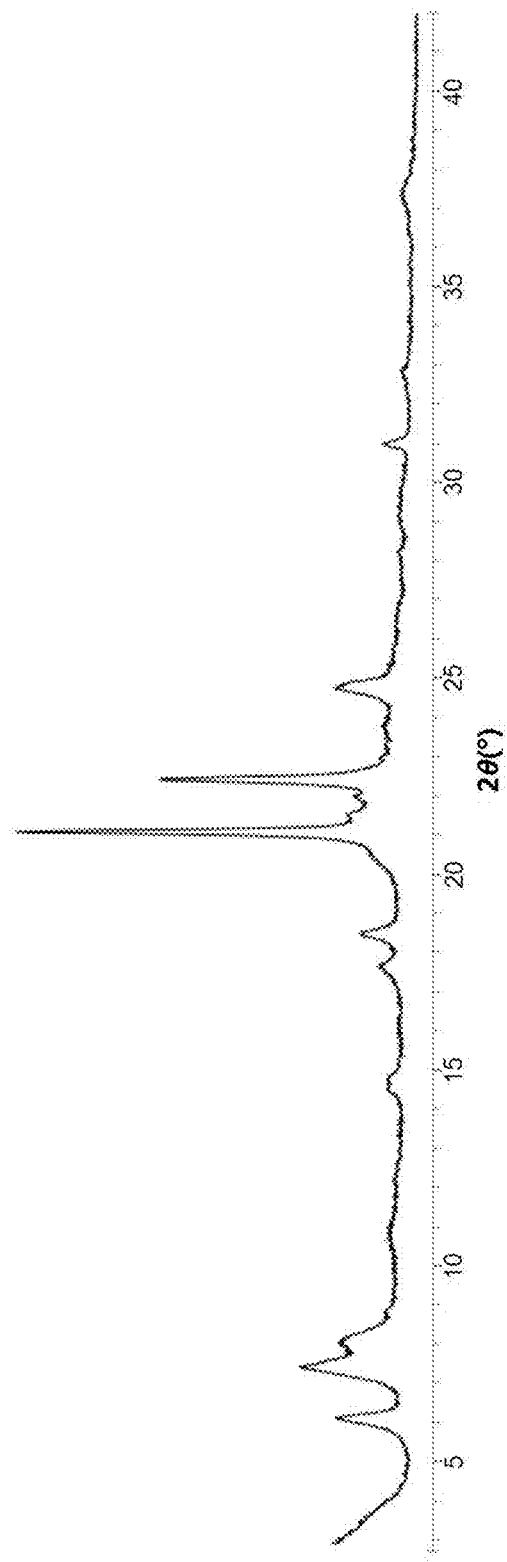
FIG. 3 is powder XRD pattern of the calcined zeolite product of Example 5.

A portion of the as-synthesized product of Example 1 was calcined according to the following procedure. The zeolite was calcined inside a muffle furnace under a flow of air heated to 595° C. at a rate of 1° C./minute and maintained at 595° C. for 5 hours. The powder XRD pattern is shown in FIG. 3 and indicated that the material remains stable after calcination to remove the organic structure directing agent.

The calcined sample was subjected to a micropore volume analysis using $N_2$ as adsorbate and via the B.E.T. method. The zeolite exhibited a micropore volume of 0.11 cm³/g.

The invention claimed is:
1. A method of synthesizing a zeolite having the structure of SSZ-31, the method comprising:
  (a) preparing a reaction mixture comprising:
    (1) a source of silicon oxide;
    (2) optionally, a source of aluminum oxide;
    (3) a structure directing agent (Q) comprising 2-ethyl-N,N,N-trimethylbutan-1-aminium cations;
    (4) hydroxide ions; and
    (5) water; and
  (b) subjecting the reaction mixture to crystallization conditions sufficient to form crystals of the zeolite.

2. The method of claim 1, wherein the reaction mixture has a composition, in terms of molar ratios, as follows:

| | |
|---|---|
| $SiO_2/Al_2O_3$ | ≥50 |
| $Q/SiO_2$ | 0.05 to 0.50 |
| $OH/SiO_2$ | 0.05 to 0.50 |
| $H_2O/SiO_2$ | 10 to 60. |

3. The method of claim 1, wherein the reaction mixture has a composition, in terms of molar ratios, as follows:

| | |
|---|---|
| $SiO_2/Al_2O_3$ | 100 to 1000 |
| $Q/SiO_2$ | 0.10 to 0.45 |
| $OH/SiO_2$ | 0.20 to 0.45 |
| $H_2O/SiO_2$ | 15 to 50. |

4. The method of claim 1, wherein the crystallization conditions include a temperature of from 125° C. to 200° C.

5. A zeolite having the structure of SSZ-31 and comprising 2-ethyl-N,N,N-trimethylbutan-1-aminium cations in its pores.

6. The zeolite of claim 5, having, in its as-synthesized and anhydrous form, a composition comprising the following molar relationship:

| | |
|---|---|
| $SiO_2/Al_2O_3$ | ≥50 |
| $Q/SiO_2$ | >0 to 0.1 | wherein Q comprises 2-ethyl-N,N,N-trimethylbutan-1-aminium cations.

7. The zeolite of claim 5, having, in its as-synthesized and anhydrous form, a composition comprising the following molar relationship:

| | |
|---|---|
| $SiO_2/Al_2O_3$ | 200 to 500 |
| $Q/SiO_2$ | >0 to 0.1 | wherein Q comprises 2-ethyl-N,N,N-trimethylbutan-1-aminium cations.

* * * * *